(12) United States Patent
Benevelli et al.

(10) Patent No.: US 11,685,218 B2
(45) Date of Patent: Jun. 27, 2023

(54) HYDRAULIC SUSPENSION SYSTEM AND METHOD FOR OPERATION OF SAID SYSTEM

(71) Applicant: Dana Motion Systems Italia S.R.L., Reggio Emilia (IT)

(72) Inventors: Alessandro Benevelli, Reggio Emilia (IT); Stefano Fasano, Reggio Emilia (IT); Daniele Dodi, Sant'Ilario d'Enza (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 412 days.

(21) Appl. No.: 16/943,404

(22) Filed: Jul. 30, 2020

(65) Prior Publication Data

US 2022/0032719 A1   Feb. 3, 2022

(51) Int. Cl.
*B60G 17/08* (2006.01)
*B60G 17/005* (2006.01)
*B60G 13/08* (2006.01)

(52) U.S. Cl.
CPC ............. *B60G 17/08* (2013.01); *B60G 13/08* (2013.01); *B60G 17/005* (2013.01); *B60G 2202/24* (2013.01); *B60G 2204/4605* (2013.01); *B60G 2204/62* (2013.01); *B60G 2206/41* (2013.01); *B60G 2400/252* (2013.01); *B60G 2400/60* (2013.01); *B60G 2500/11* (2013.01)

(58) Field of Classification Search
CPC ...... B60G 17/08; B60G 13/08; B60G 17/005; B60G 2202/24; B60G 2204/4605; B60G 2204/62; B60G 2206/41; B60G 2400/252; B60G 2400/60; B60G 2500/11; B60G 21/073; B60G 2202/154; B60G 2300/08; B60G 2500/30; B60G 17/056
See application file for complete search history.

(56) References Cited

U.S. PATENT DOCUMENTS

| 3,970,327 | A | 7/1976 | Dezelan |
| 5,338,010 | A | 8/1994 | Haupt |
| 6,578,855 | B2 | 6/2003 | Wallestad |
| 7,048,280 | B2 * | 5/2006 | Brandenburger .... B60G 17/056 280/6.159 |
| 7,059,127 | B2 | 6/2006 | Bauer et al. |

FOREIGN PATENT DOCUMENTS

DE             4242448 C1     3/1994

* cited by examiner

*Primary Examiner* — Yuen Wong
(74) *Attorney, Agent, or Firm* — McCoy Russell LLP

(57) ABSTRACT

Methods and systems for hydraulic vehicle suspension are provided. A hydraulic suspension system, in one example, includes a first manifold including a piston-side interface and a rod-side interface fluidically coupled to a piston chamber and a rod chamber, respectively, for each of a first hydraulic cylinder and a second hydraulic cylinder. In the system, the first manifold includes a first electrically activated valve fluidically coupled to the piston-side interfaces, a first damping device, and a second damping device, the first electrically activated valve is configured to lock and unlock vertical motion of the first and second hydraulic cylinders and, while vertical motion of the first and second hydraulic cylinders is locked, the first electrically activated valve permits fluidic communication between the first and second hydraulic cylinders to permit free roll motion in the hydraulic suspension system.

9 Claims, 5 Drawing Sheets

|  | Vertical Motion: Locked | Vertical Motion: Suspension Active |
|---|---|---|
| Roll Motion: Permitted | ✓ | ✓ |
| Roll Motion: Controlled | ✗ | ✓ |

HYDRAULIC SUSPENSION SYSTEM AND METHOD FOR OPERATION OF SAID SYSTEM

TECHNICAL FIELD

The present disclosure generally relates to a hydraulic suspension system with a manifold and a method for operation of the hydraulic suspension system.

BACKGROUND AND SUMMARY

Some vehicles utilize suspensions arrangements, such as independent front suspension, to achieve various handling performance characteristics. Certain suspension systems utilize double-acting hydraulic cylinders capable of vehicle handling adjustment. In specific systems, attempts have been made to use the double-acting cylinders for suspension spring rate adjustment.

U.S. Pat. No. 7,059,127 B2 to Bauer discloses a hydro-pneumatic spring support arrangement in an agricultural machine. The spring support arrangement changes the device's spring rate during ballast adjustments to conform the spring rate to dynamic vehicle ballasting conditions.

The inventors have recognized several drawbacks with Bauer's hydro-pneumatic suspension system and other vehicle suspension systems. Bauer's system demands concurrent implementation of the vehicle suspension spring rate and ballast adjustment. Furthermore, Bauer's system may experience unwanted handling characteristics due to the omission of a control scheme intended to avoid undesirable overlapping kinematic modalities. Other vehicle hydraulic suspension systems have attempted to deploy complex control circuitry aimed at circumventing certain handling characteristics. However, these systems may be complex and highly reliant on sophisticated electronic hardware which may be costly and, in the case of control circuit degradation, may be unreliable due to the diminished the capabilities of the control logic.

To overcome at least some of the aforementioned challenges, a hydraulic suspension system is provided. The hydraulic system includes, in one example, a first manifold comprising piston-side interfaces and rod-side interfaces. The piston and rod side interfaces are fluidically coupled to a piston chamber and a rod chamber, respectively, in each of a first hydraulic cylinder and a second hydraulic cylinder. In the system, the manifold includes a first electrically activated valve fluidically coupled to the piston-side interfaces of the first and second hydraulic cylinders. The manifold further includes a first damping device and a second damping device. Further in the system, the first electrically activated valve is configured to lock and unlock vertical motion of the first and second hydraulic cylinders. In the system, while vertical motion of the first and second hydraulic cylinders is locked, fluidic communication between the first and second hydraulic cylinders is permitted via the first electrically activated valve to permit free roll motion in the hydraulic suspension system. In this way, the first electrically activated valve arranged between the hydraulic cylinders and the damping devices allows suspension roll motion to occur while vertical motion of both cylinders is locked. In this way, a condition where both roll and vertical motion are locked, which may decrease handling performance below a desired level, can be avoided, if wanted.

Further in one example, the hydraulic suspension system may further include a plurality of piloted check valves fluidically coupled to the piston-side interfaces and the rod-side interfaces. In such an example, the plurality of piloted check valves may be fluidically coupled to a load sensing (LS) component via a second electrically activated valve. Arranging the piloted check valves in this manner allows suspension roll motion to be locked and unlocked during desired periods of system operation. For instance, suspension roll motion may be permitted while the vertical motion of the first and second hydraulic cylinders is locked. Suspension roll motion may also be permitted when the system's leveling function (e.g., cylinder position and/or pressure adjustment) is active. In this way, fluid may flow to both cylinders during leveling operation. Consequently, the stiffness and position of the cylinders may be more balanced in relation to one another which may enable the vehicle to achieve desired handling characteristics, if so desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A hydraulic suspension system with a modular manifold is described herein. The manifold allows the hydraulic suspension system to passively avoid unwanted system control variants, if desired. For example, the hydraulic suspension system may be designed to lock vertical motion of two hydraulic cylinders and may prevent a condition where one cylinder is locked while the other is unlocked. In this way, decreased handling performance caused by mismatched locking/unlocking conditions of the two hydraulic cylinders may be avoided. This vertical locking functionality may be achieved using a valve in fluidic communication with piston chambers in both the hydraulic cylinders and multiple associated damping devices. Further, in one example, the hydraulic suspension system may be designed to prevent roll motion lock between two hydraulic cylinders while vertical motion of the hydraulic cylinders is locked. In this way, a solid lock condition in the system where both roll motion and vertical motion are locked can be avoided, if wanted. Consequently, decreased handling performance stemming from the solid lock condition may be avoided.

The hydraulic system may be further designed to prevent roll motion lock while the system's leveling function (e.g., cylinder position and/or stiffness adjustment) is active. Further, in some embodiments, suspension roll motion may be designed to passively lock and allow the hydraulic cylinders to move independently. The passive locking feature of the hydraulic cylinders may enable the hydraulic suspension system to achieve desired higher speed handling characteristics. The aforementioned roll motion features may be achieved via a plurality of piloted check valves arranged between the two hydraulic cylinders. The piloted check valves may close and open to lock and unlock roll motion, respectively. The piloted check valves may fluidically couple to a second electrically activated valve which may fluidically couple to a load sensing (LS) line. Some aspects of suspension roll motion and vertical lock management may be passively deployed using the piloted check valves in the system. Certain combinations of operational variants may therefore be passively enabled while others may be avoided to at least partially satisfy system control goals using a smart hydraulic circuit architecture. In this way, the suspension system may achieve desired control variants using an efficient hydraulic circuit architecture while decreasing the complexity of the system's programmatic controls, if wanted.

Figure 1:
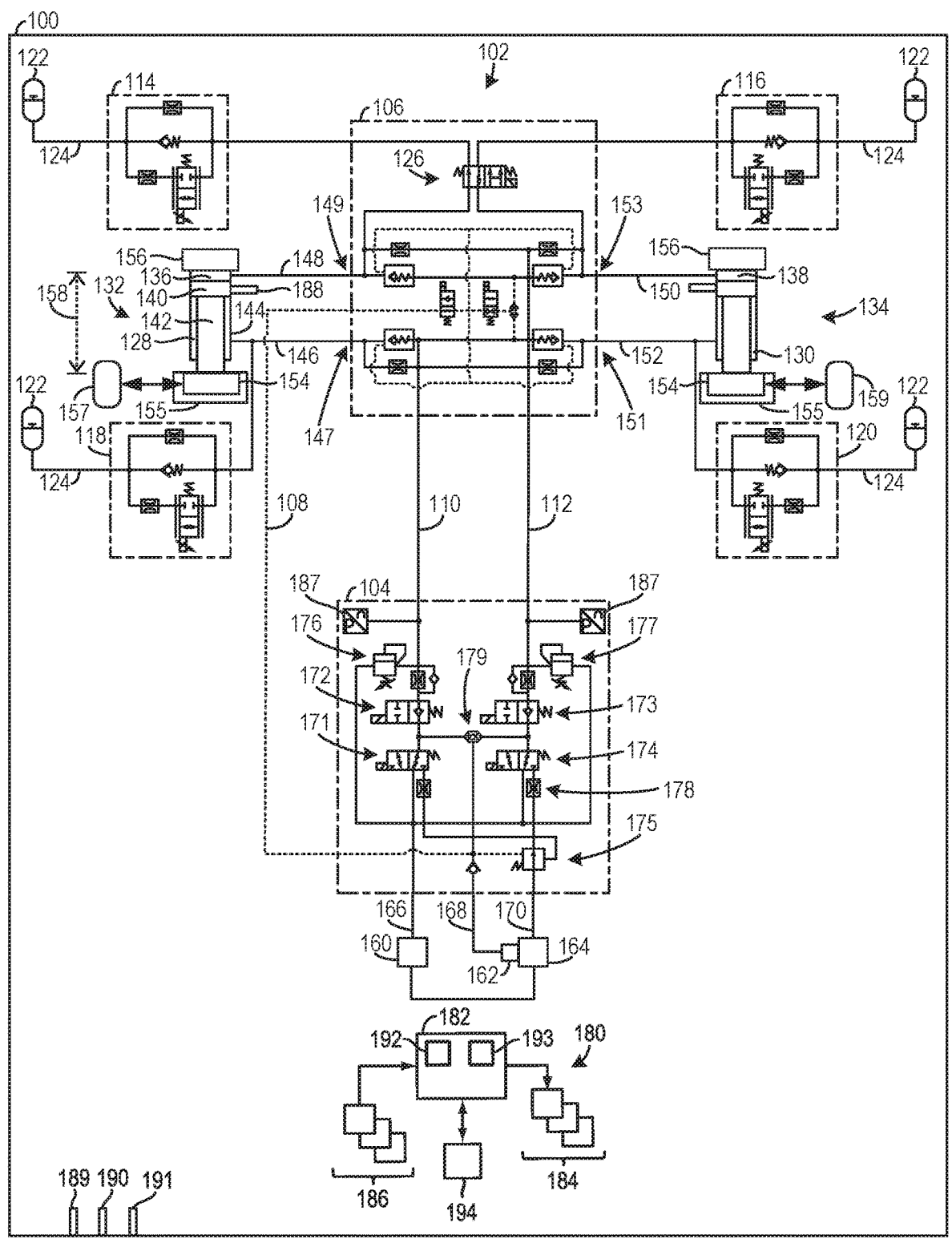
FIG. 1 shows a schematic representation of a vehicle including a first embodiment of a hydraulic suspension system with a first manifold and a second manifold.
Figure 2:
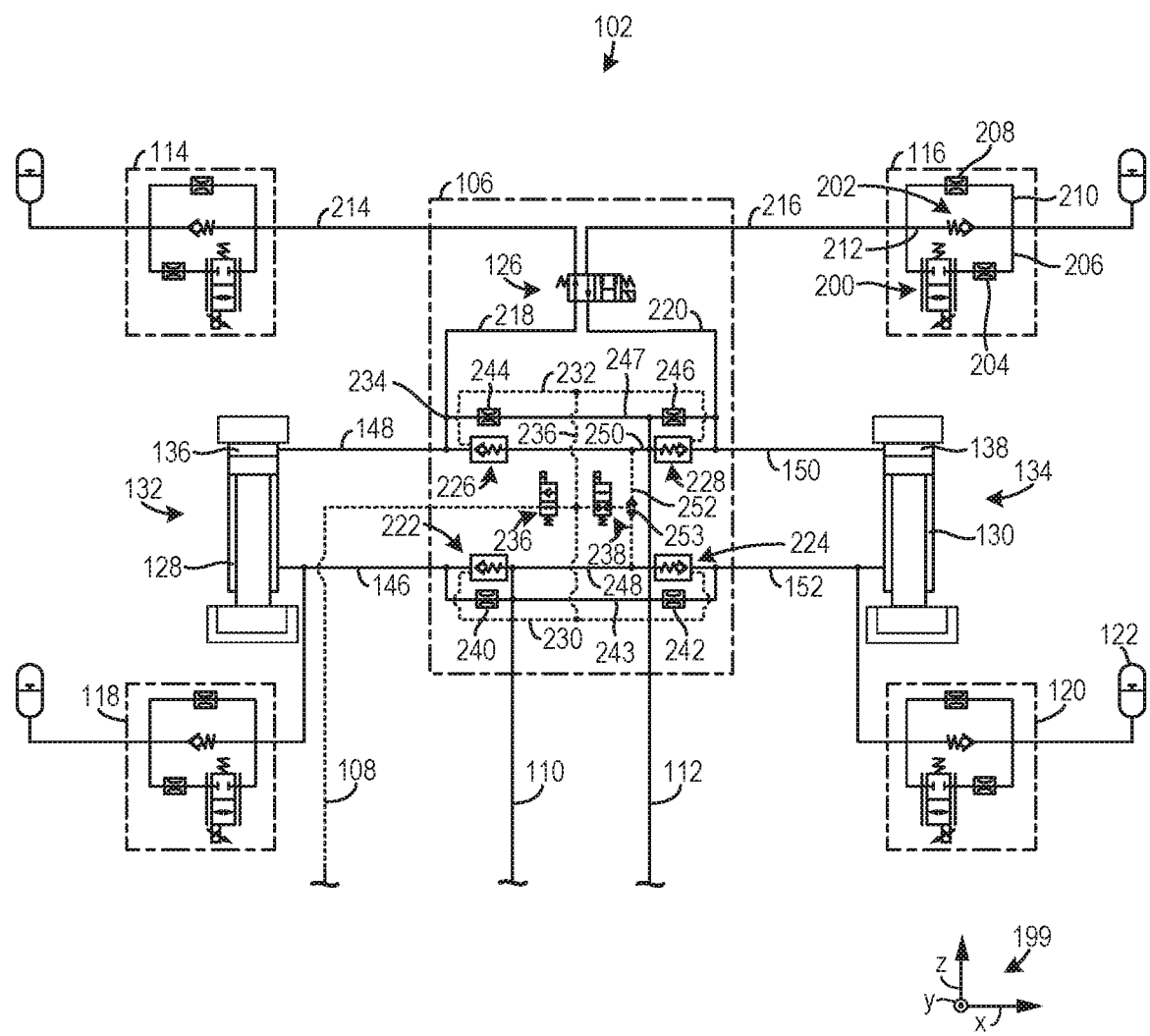
FIG. 2 shows a detailed view of the first manifold of the hydraulic suspension system, depicted in FIG. 1.
Figure 3:
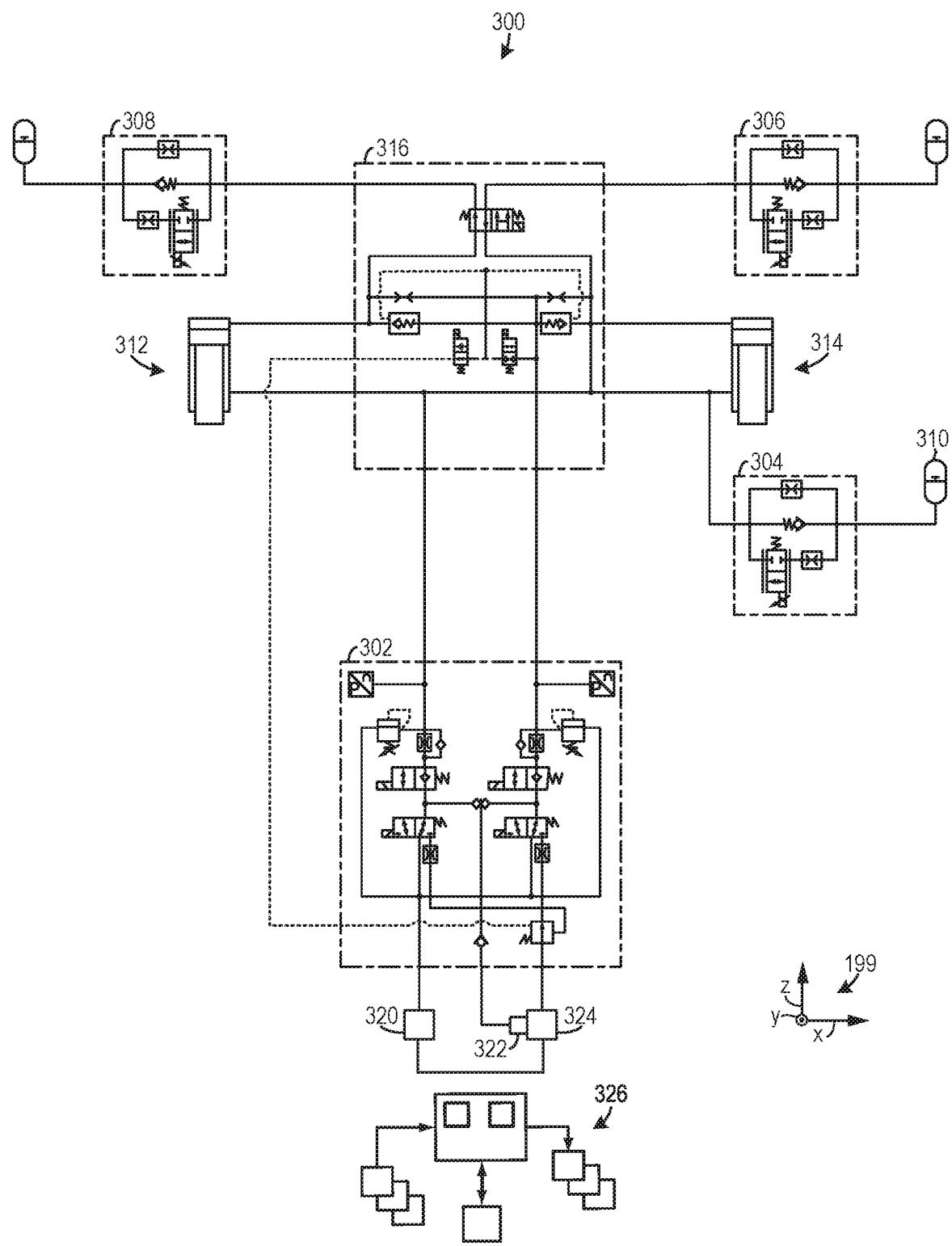
FIG. 3 shows a second embodiment of a hydraulic suspension system with multiple manifolds.
Figure 4:
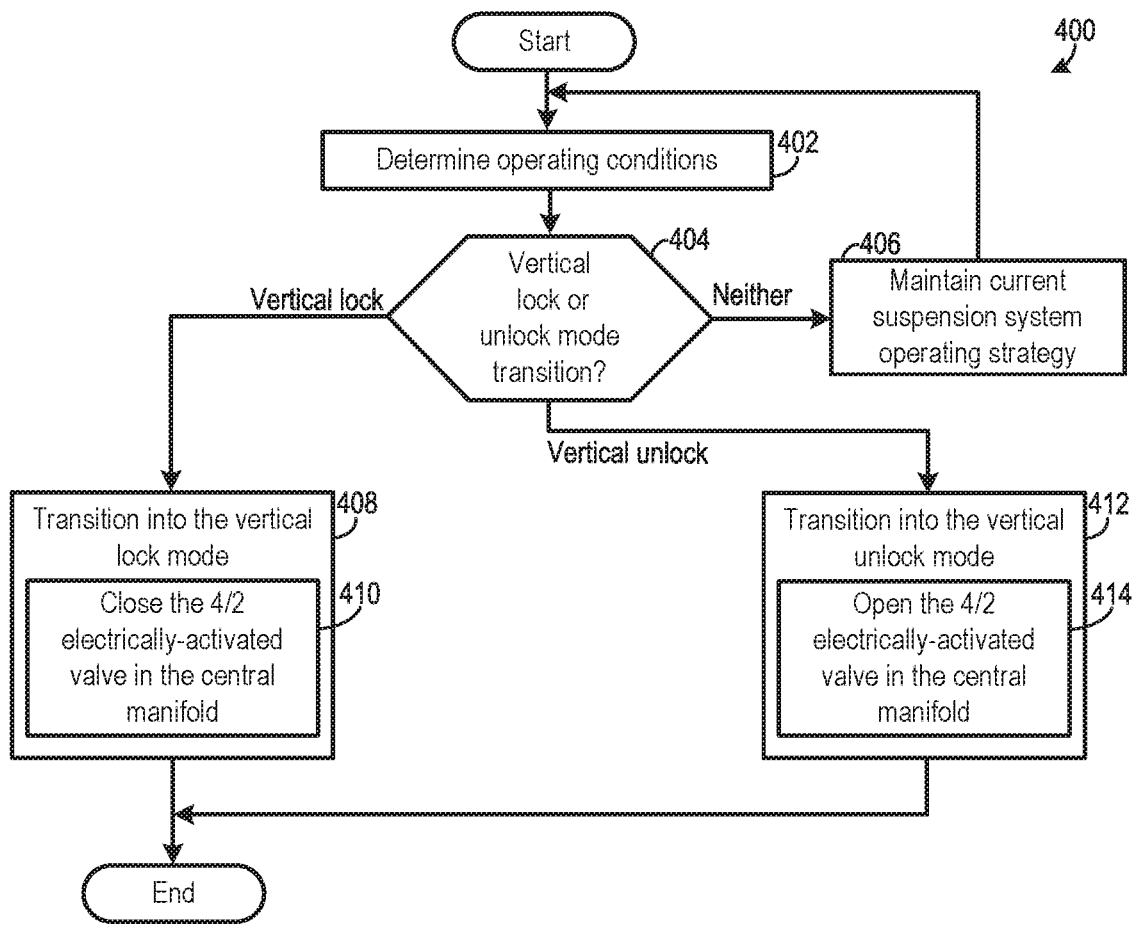
FIG. 4 shows a method for operation of a hydraulic suspension system.
Figures 5, 6:
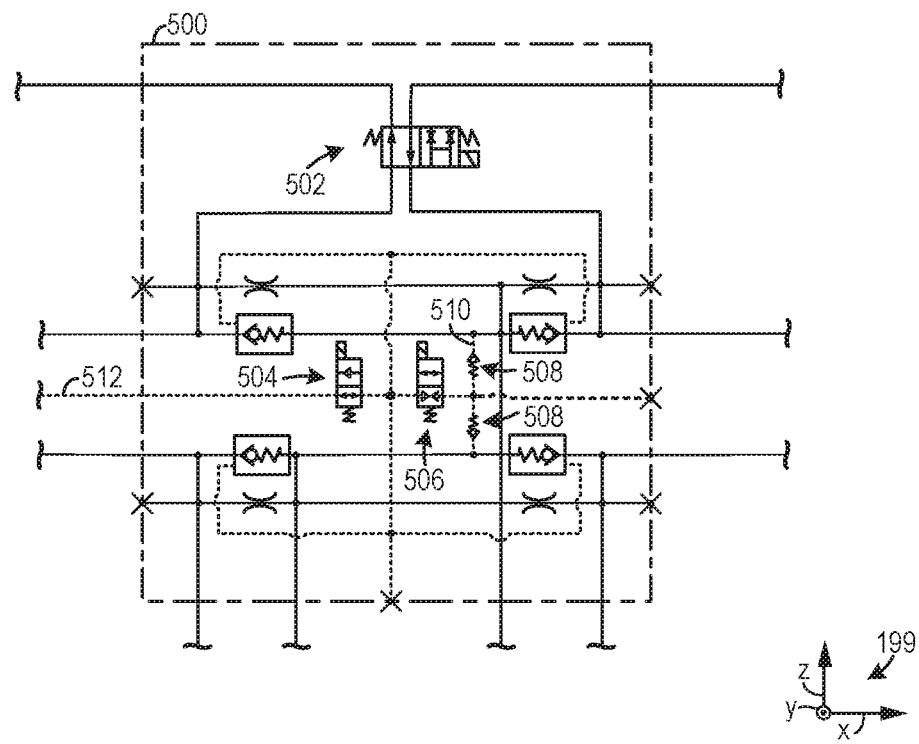
FIG. 5 shows a third embodiment of a hydraulic suspension system with multiple manifolds.
FIG. 6 shows a table indicating use-case operating modes of the first manifold, depicted in FIG. 2.

FIG. 1 depicts a hydraulic suspension system in a vehicle with a leveling manifold and a manifold for axle roll motion and cylinder vertical motion control. FIG. 2 shows a detailed illustration of a first embodiment of the manifold designed with roll motion and vertical motion lock and unlock functionality. FIG. 3 depicts a second embodiment of a manifold with axle roll motion and vertical cylinder motion adjustment features. FIG. 4 shows a method for operation of a suspension system. FIG. 5 illustrates a third embodiment of a manifold for roll and vertical motion control. FIG. 6 shows a chart indicating an operational matrix related to suspension system roll and vertical motion locked and unlocked configurations.

FIG. 1 illustrates a vehicle 100 with a hydraulic suspension system 102. The vehicle 100 may, in one example, be an agricultural or industrial vehicle. In other examples, the vehicle may be a light, medium, or heavy duty commercial vehicle, passenger vehicle, and the like. Agricultural and industrial vehicles may, in certain instances, experience wider variances in load and/or speed during use and therefore may be particularly suited to leverage performance gains from the hydraulic suspension system's kinematic adjustability described herein. However, other vehicles may similarly exhibit suspension performance gains and the hydraulic suspension system therefore may have applicability across a wide variety of vehicle platforms to achieve targeted kinematic characteristics.

The hydraulic suspension system 102 may be designed with modular component groups to facilitate an expansion of the hydraulic suspension system's functionality and adaptability, if wanted. Consequently, the suspension platform may be deployed in an even wider array of vehicles, which may further increase the platform's customer appeal.

The hydraulic suspension system 102 may include a leveling manifold 104. The hydraulic suspension system 102 may further include a manifold 106 (e.g., central manifold) designed to manage suspension roll motion (e.g., axle roll motion) and/or hydraulic cylinder vertical locking operation. Suspension roll motion may be the side-to-side angular movement of the suspension system and particularly the axle with regard to a horizontal axis or plane. The layout of the hydraulic components and specific structure and function of the manifold components is elaborated upon herein with regard to FIG. 2.

The leveling manifold 104 may couple to the manifold 106 via an LS line 108, line 110 (e.g., rod-side line), and a line 112 (e.g., piston-side line). As described herein, the coupling between hydraulic lines, components, etc. may denote fluidic coupling between the components where fluidic communication is established. The LS line 108 and the other load sensing conduits illustrated in FIG. 1 as well as FIGS. 2 and 3 are designated via dotted lines. However, it will be understood that the LS lines and the other hydraulic lines described herein function as conduits for the system's working fluid. Further, as described herein a line may a hydraulic conduit which encloses a hydraulic fluid and provides fluidic coupling between components to which it is attached.

The hydraulic suspension system 102 may further include a first damping device 114, a second damping device 116, a third damping device 118, and/or a fourth damping device 120. As illustrated in FIG. 1, potential boundaries of the following devices: the leveling manifold 104; the manifold 106; and the damping devices 114, 116, 118, 120, are demarcated via twodash style lines. Thus, the twodash lines are themselves not directly indicative of hydraulic conduits. However, it will be appreciated that in other embodiments these devices may have different component groupings.

Each of the damping devices 114, 116, 118, 120 may be in fluidic communication with an accumulator 122 via lines 124. The accumulators 122 may act as storage reservoirs and may include housings, interior chambers, and the like. The first and second damping devices 114, 116 may be in fluidic communication with an electrically activated valve 126 in the manifold 106. The electrically activated valve 126 may be referred to as a first electrically activated valve. The second and third damping devices 118, 120 may be in fluidic communication with rod chambers 128, 130 in a first hydraulic cylinder 132 (e.g., a left cylinder) and a second hydraulic cylinder 134 (e.g., a right cylinder), respectively. It will be appreciated that the first and second hydraulic cylinders may be associated with one of the vehicle axles (e.g., the front vehicle axle). The damping devices may be configured to modulate vibrations of the hydraulic cylinders.

The first hydraulic cylinder 132 may further include a piston chamber 136. The second hydraulic cylinder 134 may similarly include a piston chamber 138. The first and second hydraulic cylinders 132, 134 may each include a piston 140, a piston rod 142, a piston barrel 144, etc. which allow for the system's height, stiffness, roll motion, and/or vertical lock modes to be implemented. The hydraulic cylinders 132, 134 may therefore take the form of double acting hydraulic cylinders. The system's control modes are elaborated upon herein.

The piston chamber 136 may couple to the manifold 106 via line 146 and the rod chamber 128 may couple to the manifold via line 148. Thus, the manifold 106 may include a first rod-side interface 147 and a first piston-side interface 149. Likewise, the piston chamber 138 may couple to the manifold 106 via a line 150 and the rod chamber 130 may couple to the manifold via a line 152. The manifold 106 may further include a second rod-side interface 151 and a second piston-side interface 153. As described herein, the piston and rod side chambers may include cavities, walls, valving, and/or other piston and rod side components, respectively.

The first and second hydraulic cylinders 132, 134 may mechanically couple to a first vehicle component 154 (e.g., a vehicle axle) and a second vehicle component 156 (e.g., a vehicle chassis). To elaborate, the first and second hydraulic cylinders 132, 134 may mechanically couple to the axle and the vehicle chassis at distinct locations (e.g., at locations on laterally opposing sides of the vehicle). For instance, the first hydraulic cylinder 132 may mechanically couple to a first suspension arm or other suitable axle component and the second hydraulic cylinder 134 may mechanically couple to a second suspension arm or other suitable axle shaft component. However, a variety of axle interfaces have been envisioned. To elaborate, in one embodiment, the vehicle axle may be included in an independent front suspension assembly 155. The independent front suspension assembly may include pivoting driveshafts connected via joints (e.g., universal joints) to allow opposing wheels 157, 159 to independently articulate, under certain conditions. The independent front suspension assembly may comprise a differential and/or other conventional front suspension components.

In one embodiment, the vehicle axle may be a steerable axle, such as a front axle. In this way, the hydraulic suspension system may manage vehicle steering characteristics. However, in other examples, the first and second hydraulic cylinders 132, 134 may mechanically couple to a rear axle. The relative position between the first and second vehicle components may be referred to as the suspension's position (e.g., ride height). A distance between the first vehicle component 154 and the second vehicle component 156, dictated by the hydraulic cylinders, is indicated at 158. During a position adjustment mode, this distance may be lengthened or shortened to vary ride height. For instance, the cylinder's height may be adjusted taking into account vehicle weight distribution. The variation in the system's ride height may bolster various aspects of vehicle operation such as handling, material loading/unloading operation, and the like.

The leveling manifold 104, manifold 106, and the damping devices 114, 116, 118, 120 may have a modular design, which enables the manifold to be efficiently incorporated into a vehicle system. The modularity of these components may further allow for system reconfiguration and/or include additional modules intended to meet targeted end-use design goals of a specific vehicle platform, if desired. In this way, the suspension system's adaptability can be expanded, thereby increasing customer appeal.

The leveling manifold 104 may couple to a tank 160, a load sensing (LS) component 162 (e.g., compensator), and/or a pump 164 or other suitable pressure source. A tank line 166 may extend between the tank 160 and the leveling manifold 104 and provide fluidic connection there between. A load sensing line 168 may extend between the LS component 162 and the leveling manifold 104 and a pump line 170 may extend between the pump 164 and the leveling manifold. It will be appreciated that additional components may be positioned between the tank, LS component, and/or the pump and the leveling manifold, in other embodiments.

The tank 160 may function as a reservoir for the system's working fluid. The system's working fluid be a suitable hydraulic fluid such as oil (e.g., natural and/or synthetic oil). Thus, the tank 160 may include a housing which encloses the system's working fluid. The pump 164 may be designed to deliver pressurized fluid to the leveling manifold 104. For instance, the pump may be a variable displacement pump (e.g., axial piston pump). However, other suitable types have pumps have been contemplated such as axial-flow pumps, centrifugal pumps, a pump with a pressure vessel, etc. The LS component 162 may be coupled to the pump 164. Thus, the LS component 162 and pump 164 may work in conjunction to adjust pump output based on the load sensing pressure. For instance, the LS component (e.g., pressure compensator) may constrain a higher operating pressure (e.g., an upper operating pressure) by reducing pump displacement (e.g., reducing pump displacement to a lower value such as substantially zero) when the threshold pressure is reached. The LS component may therefore function as a pump control device. The leveling manifold 104 may include a plurality of electrically activated valves. The valves may include a first valve 171, a second valve 172, a third valve 173, and/or a fourth valve 174. The first valve 171 may be a 3-way/2-position (3/2) valve with three hydraulic ports and two positions. The third valve 173 may similarly be a 3/2 type valve. The second valve 172 may be a 2/2 valve and the fourth valve 174 may similarly be a 2/2 style valve. However, other valves configurations have been envisioned. The leveling manifold 104 may further include a pressure compensator 175 designed to manage supply pressure in relation to load sensing. The leveling manifold 104 may further include a relief valve 176 bypassing the first and second valves 171, 172 and a relief valve 177 bypassing the third and fourth valves 173, 174.

The leveling manifold 104 may further include a plurality of orifices 178 designed to manage and set leveling function speed. To elaborate, the orifices 178 may dictate the rate of suspension stiffness and position adjustment. The orifice sizing may be tuned based on end-use targets. The orifices may therefore include a housing with an interior profiled for flow restriction. The leveling manifold may further include a shuttle valve 179 which may allow the LS component 162 to see the higher pressures in lines between the valves.

The vehicle 100 may further include a control system 180 with a controller 182, actuators 184, and sensors 186. The controller 182 may encompass the control device of the pump 164, discussed above. Thus, the controller 182 and more generally the control system 180 may encompass one or more physical devices that may be collocated and/or remotely located for implementing hydraulic system control strategies. The controller 182 may receive signals from the sensors 186 positioned in various locations in the suspension system 102 and vehicle 100. The sensors may include pressure sensors 187 coupled to lines in the leveling manifold 104, a position sensor 188 coupled to the hydraulic cylinders 132, 134, a temperature sensor 189, a vehicle speed sensor 190, a vehicle load sensor 191, and the like.

The controller 182 may send control signals to the actuators 184 positioned at different locations in the suspension system 102 and vehicle 100. For instance, the controller 182 may send signals to actuators in the leveling manifold 104 such as actuators of components in the leveling manifold (e.g., valves 171, 172, 173, 174), actuators of components in manifold 106, actuators of components in the damping device 114, 116, 118, 120 and the like. For example, the controller 182 may send a control signal to an actuator in a valve to turn the valve on or off. Thus, the other controllable components in the suspension system may similarly function with regard to command signals and actuator adjustment.

The controller 182 may include suitable circuitry for carrying out the sensing and control functionality such as memory 192 and a processor 193, in one example. In such an example, of the controller 182 may hold instructions stored therein that, when executed by the processor 193, cause the controller to perform the various methods, control techniques, etc. described herein. The processor 193 may include a microprocessor unit and/or other types of circuits. The memory 192 may include known data storage mediums such as random access memory, read only memory, keep alive memory, combinations thereof, etc. However, the controller may include additional or alternative circuitry for carrying out the sensing and control strategies described herein.

The controller 182 may couple to an input device 194 (e.g., a console instrument panel, a touch interface, a touch panel, a keyboard, combinations thereof, etc.). The input device 194, responsive to driver input, may generate a request to adjust suspension stiffness and/or position, trigger cylinder motion locking/unlocking, trigger suspension roll motion locking/unlocking, etc. However, in other examples, the aforementioned control operations may be automatically adjusted based on vehicle operating conditions.

The control system 180 may operate the leveling manifold 104 in different modalities which enable the position and stiffness of the hydraulic cylinders 132, 134 to be independently adjusted. To elaborate, the leveling manifold 104 may, in a position adjustment mode, deliver fluid to the piston chambers of the hydraulic cylinders 132, 134 to extend the suspension (e.g., increase the height of the chassis (e.g., front chassis) while substantially maintaining a pre-set target pressure in the rod chamber (slightly discharging rod chamber). Additionally, the leveling manifold may, in the position adjustment mode, discharge fluid from the piston chambers of the hydraulic cylinders in order to retract the suspension itself (e.g., lowering-down the vehicle chassis), while substantially maintaining a pre-set target pressure in the rod chamber (e.g., slightly pressurizing rod chamber). In a pressure adjustment mode, the leveling manifold may pressurize the piston and rod chambers of the hydraulic cylinders to increase suspension stiffness without substantially changing axle position, if wanted. Further, in the pressure adjustment mode, the leveling manifold may discharge both the piston and rod chambers of the hydraulic cylinders in order to reduce suspension stiffness without substantially changing axle position. In this way, the operational functionality of the suspension system is expanded which enables the suspension system's degrees of freedom to be correspondingly increased. The system's ride height and suspension stiffness may therefore be granularly adjusted at separate times to more aptly suit at least some the operating conditions experienced by the vehicle, if so desired. The control system may further be designed to control suspension roll motion and vertical cylinder movement, elaborated upon herein.

An axis system 199 is provided in FIG. 1 as well as FIGS. 2, 3, and 5, for reference. The z-axis may be a vertical axis, the x-axis may be a lateral axis (e.g., horizontal axis), and/or the y-axis may be a longitudinal axis, in one example. However, the axes may have other orientations, in other examples.

FIG. 2 illustrates a detailed depiction of the manifold 106 (e.g., central manifold), the damping devices 114, 116, 118, 120, and the accumulators 122. The damping devices 114, 116, 118, 120 may be configured to manage proportional damping between a lower value (e.g., minimum value) and a higher value (e.g., maximum value) based on transient conditions. The lower value may occur when a proportional valve is closed (e.g., fully closed) and the higher value may occur when the proportional value is open (e.g., fully opened). In one example, damping may be increased (e.g., maximized) while the vehicle is braking or accelerating to perform anti-dive/lift functions. Continuing with such an example, right and left damping may be managed independently, to increase vehicle handling performance while cornering at high speed (e.g., maximizing damping on external cornering side valves). As such, in this example, the damping valve may be managed to improve longitudinal and lateral vehicle dynamics. Consequently, the vehicle's handling performance may be increased, thereby increasing customer appeal and satisfaction.

Each of the damping devices 114, 116, 118, 120 may have similar components, in one embodiment. For instance, each of the damping devices may include an electrically activated valve 200 (e.g., proportional valve), a check valve 202 coupled in parallel with the electrically activated valve, a first orifice 204 positioned in a line 206, and/or a second orifice 208 positioned in a line 210 arranged parallel to line 212 and 206. However, other damping device arrangements have been envisioned. Further, in other embodiments, the configurations of the damping devices may vary, which may increase system complexity.

The LS line 108, rod-side line 110, an piston-side line 112 connecting the manifold 106 to the leveling manifold 104 shown in FIG. 1, are again illustrated in FIG. 2. The damping devices 114, 116 are shown connecting to the electrically activated valve 126 via lines 214, 216, respectively. The electrically activated valve 126 may be a 4/2 type valve with four hydraulic ports and two positions. The four hydraulic ports provide fluidic communication between the valve 126 and the first damping device 114, the second damping device 116, the piston chamber 136, and the piston chamber 138. However, the valve 126 may have another suitable configuration, in other embodiments.

In an open position, the electrically activated valve 126 permits flow between the first damping device 114 and the piston chamber 136 via line 218 and permits flow between the second damping device 116 and the piston chamber 138 via line 220. However, in the open position of the valve, cross flow between the piston chambers by way of the valve may be inhibited.

Conversely, in the closed position, the electrically activated valve 126 may form a bridge connection (e.g., H-bridge connection) between the lines 218, 220. Thus, in the H-bridge connection example, a cross-over conduit extends between two lines connecting the piston chambers to their respective dampers. The bridge connection allows the system to exhibit free roll movement in the suspension independent from a plurality of check valves in the manifold which enables a solid lock condition (a condition where both vertical and roll motion in the system is locked) to be avoided, if desired. Further, in the bridge connection, flow between the piston chamber 136 and first damping device 114 is restricted. Further, in the bridge connection, flow between the piston chamber 138 and second damping device 116 is restricted. To elaborate, sections of the H-bridge connection on the accumulator side of the connection may be specifically restricted. The restrictions in the bridge connection in the valve 126 allow for pressure stabilization of the piston chambers 136, 138 after transients between the piston chambers and a plurality of accumulators coupled to the first and second damping devices. As such, oscillatory motion in the system may be attenuated when the valve 126 is closed. The electrically activated valve 126 may be designed to close in response to energization and open in response to de-energization. In this way, the valve's open configuration may be a passive condition.

Opening the electrically activated valve 126 places the hydraulic system in an unlocked state with regard to vertical motion of the cylinders. In the unlocked state, vertical suspension movement of the hydraulic cylinders 132, 134 is permitted. On the other hand, closing the electrically activated valve 126 places the hydraulic system in locked state with regard to vertical motion of the cylinders. When the valve is designed to be open when de-energized, a suspension locking condition may be avoided when the valve exhibits degradation.

The first hydraulic cylinder 132 with the piston and rod chambers 136, 128 and the second hydraulic cylinder 134 with the piston and rod chambers 128, 130 are illustrated in FIG. 2. Lines 146, 148 connected to the rod and piston chambers 128, 132 of the first hydraulic cylinder 132 are further illustrated in FIG. 2. Lines 150, 152 connected to the piston and rod chambers 128, 130 of the second hydraulic cylinder 134 are additionally shown in FIG. 2. Each of the lines 146, 148, 150, 152 may couple to a first piloted check valve 222, a second piloted check valve 224, a third piloted check valve 226, and a fourth piloted check valve 228, respectively. Pilot line 230 may couple the first check valve 222 to the second check valve 224. Pilot line 232 may couple the third check valve 226 to the fourth check valve 228. Junctions 234 shown in FIG. 2 denote a fluidic junction between two lines facilitating fluidic communication between the lines. This junction notation is utilized in the other figures described herein.

The manifold 106 may further include an electrically activated valve 236 and an electrically activated valve 238. The electrically activated valve 236 may be a VNO type valve and the electrically activated 238 may be a VCN type valve. However, other suitable valve types have been contemplated. The electrically activated valve 236 may be referred to as a second electrically activated valve and the valve 238 may be referred to as a third electrically actuated valve or vice versa. It will further be appreciated that the valves 236, 238 may be referred to as piloting control valves.

The manifold 106 may further include a first orifice 240 and/or a second orifice 242 in a line 243. The manifold 106 may further include a third orifice 244 and a fourth orifice 246 residing in a line 247. The orifices restrict flow through the line to which they are attached and may include a housing with a flow restriction therein. The line 243 may be arranged parallel to a line 248 in which the first and second piloted check valves 222, 224 reside. Likewise, the line 247 may be arranged parallel to a line 250 in which the third and the fourth piloted check valves 226, 228 reside. Positioning the orifices parallel to the piloted check valves allows pressure stabilization between opposing (e.g., left and right) cylinder piston chambers, thereby decreasing the chance of the variance in the cylinder pressures from exceeding a targeted level. To expound, placing the orifice in parallel with the piloted check valves provides pressure stabilization after roll transients, when roll motion is locked, which prevents cylinder pressure variance from surpassing a desired level after several roll moments.

The architecture of the piloted check valves 222, 224, 226, 228 may allow roll motion to be locked and unlocked when desired. To elaborate, when the piloted check valves 222, 224, 226, 228 are closed, suspension roll motion may be locked. Conversely, while the piloted check valves are opened suspension roll motion may be unlocked.

To manage piloted check valve status, the higher pressure between the piston and rod chambers of the hydraulic cylinders 132, 134 may be used to supply the hydraulic fluid to the piloting line via the electrically activated valve 238. Lines 250 couple the piloted check valves to the electrically activated valve 238.

The manifold 106 may further include a shuttle valve 253 having lines 252 extending between the valve and lines 248, 250. The shuttle valve 253 may allow the valve 238 to see the higher pressure of the lines 248, 250. However, in other embodiments the shuttle valve 253 may be omitted from the manifold 106. FIG. 5 shows an embodiment of a manifold 500 with a valve 502 (e.g., a 4/2 type valve), a valve 504, and a valve 506. These and other components in the manifold 500 may have structural and functional features similar to those described with regard to the manifold 106, shown in FIGS. 1-2. Redundant description is therefore omitted for brevity. The manifold 500 shown in FIG. 5, however, replaces the shuttle valve with check valves 508 in lines 510 coupled to the valve 506. This modification to the manifold 500 may allow for more robust pressurization using line 512 during leveling operation independent from operation of the valves 504, 506.

Returning to FIG. 2, in one implementation, the electrically activated valve 238 may be closed when it is de-energized to enable the roll motion to be passively locked. When the suspension roll motion is passive locked, the first and second hydraulic cylinders 132, 134 may move independently. The roll motion may be passively locked during higher speed vehicle operation to increase vehicle handling performance. The electrically activated valve 236 may be opened when it is de-energized such that the piloting lines are discharged via the LS line 108 which may be connected to the tank 160 shown in FIG. 1. To lock suspension roll motion both the valves 236, 238 may be energized via a common command to pressurize the pilot lines 230, 232 of the check valves 222, 224, 226, 228.

To allow roll motion to be unlocked while leveling operation is active, the electrically activated valve 236 may be connected to the LS line 108 which is routed to the leveling manifold 104, shown in FIG. 1. Connecting the valve 236 to the LS line 108, allows the LS line to pressurize the pilot lines 230, 232 for the check valves 222, 224, 226, 228 when the leveling manifold is operational. Consequently, the piloted check valves may be piloted open during leveling operation to consistently deliver fluid to both hydraulic cylinders, independent from the control status of the electrically activated valves 236, 238, if so desired. In this way, roll motion may be passively unlocked to achieve desired handling characteristics and potentially avoid a condition where roll motion is unlocked while vertical motion is locked. To elaborate, when the leveling operation is active and the piloted check valves are unlocked, cylinder leveling may be balanced. Consequently, the system may achieve substantially symmetric leveling which may potentially avoid a condition where one of the valves degrades and only one of the cylinders is allowed to move. In this way, vehicle handling performance is increased. The orifice 240, 242, 244, 246 allow for the balance pressure between left and right cylinders after transients. Additionally, the orifices integrated into the valve 126 may provide a relatively slow pressure balance between the accumulator and piston when vertical motion is locked, in some implementations.

Further, in one example, the line 108 connecting manifold 106 to the leveling manifold 104, depicted in FIG. 1, may be used to discharge the working fluid from the accumulators 122 during servicing, for instance. The control system may carry out accumulator discharge operation through the energization of the electrically activated valve 238 to open said valve. Further, during accumulator discharge operation, the control system may turn off the other valves in the manifold 106 and/or the leveling manifold 104. With the valves in the manifolds in the aforementioned arrangement, the working fluid will flow from the accumulators to the tank 160 through line 108 valve 171 and/or valve 174, shown in FIG. 1. Thus, the LS line 108 may serve as a drain passage during servicing. In this way, the system's servicing and/or repair efficiency may be increased.

Further, in an alternate embodiment, the valves 236, 238 may be replaced with a 3/2 style valve but may retain the previously mentioned functionality of the valves 236, 238.

However, using the two valves 236, 238 (e.g., the 2/2 style valves) may reduce the likelihood of fluid leaks from line 108 potentially leading to decreasing the height of the suspension.

FIG. 3 shows a second embodiment of a hydraulic suspension system 300 which may include a leveling manifold 302, dampening devices 304, 306, 308, accumulators 310, hydraulic cylinders 312, 314, tank 320, LS component 322, pump 324, and control system 326. The aforementioned components may have a similar structure and function to the corresponding components in the suspension system 102 shown in FIGS. 1 and 2.

The suspension system 300 may further include a manifold 316 with a modified arrangement. The suspension system 300, illustrated in FIG. 3, has one fewer rod-side damping device when compared to the suspension system 102, depicted in FIGS. 1 and 2. However, systems with fewer than three or greater than four damping devices have been contemplated. Two of the piloted check valves coupled to the rod chambers of the hydraulic cylinders 312, 314 are omitted from the manifold 316, depicted in FIG. 3. In this way, fluidic communication between the rod chambers of the hydraulic cylinders may persist during the different modal control strategies. The suspension system 300 may achieve similar functionality with regard to the roll motion and vertical motion locking/unlocking features in comparison to the suspension system 102, shown in FIGS. 1 and 2. For example, the suspension system 300, and specifically the manifold 316, may be configured to lock and unlock cylinder vertical motion and axle roll motion. However, the suspension system 300 may have a slightly smaller range of actuator force controllability during transient conditions due to the reduced number of damping devices in comparison to the suspension system 102, depicted in FIGS. 1 and 2.

Referring to FIG. 4, a method 400 for operating a hydraulic suspension system is shown. The method 400 may be implemented via one or more of the vehicle, hydraulic suspension systems, and system components described above with regard to FIGS. 1-3 and/or 5. However, in other examples, the method 400 may be implemented by other suitable vehicles, hydraulic suspension systems, and/or the system components. Furthermore, in one embodiment, the method 400 may be stored as instructions in non-transitory memory executable by a processor of a controller, such as the controller 182 depicted in FIG. 1. However, additional or alternate types of suitable control circuitry may be used, in other embodiments.

At 402, the method includes determining operating conditions. The operating conditions may include vehicle speed, vehicle load, ambient temperature, suspension cylinder position, suspension cylinder stiffness, input device position, and the like. These conditions may ascertained from sensor signals and/or modeled.

At 404, the method determines whether to transition into a mode where cylinder vertical motion is locked or to transition into a mode where cylinder vertical motion is unlocked. Such a determination may take into account system operating conditions, such as vehicle speed, vehicle load, operator activated input device configuration, etc. Specifically, in one example, the vehicle operator may lock and unlock vertical motion at their discretion and based on working conditions, for example. Additionally or alternatively, the controller may be designed to unlock vertical suspension movement when the vehicle travels above a predetermined speed, to increase the vehicle's handling performance. For instance, the vehicle operator may lock vertical suspension movement when they are connecting an accessory on the front hitch or are working with a front loader. Conversely, when the operator drives the vehicle on a road or field above a threshold speed (e.g., 5 km/h, 6 km/h, 10 km/h, etc.), vertical movement may be automatically unlocked to increase the vehicle's handling performance. As previously discussed, the design of the 4/2 type valve in the central manifold of the hydraulic system allows (e.g., guarantees) roll motion to occur while vertical lock is enabled, to reduce the chance of the system exhibiting decreased handling performance.

If it is determined that neither mode transition is wanted, the method moves to 406. At 406, the method includes maintaining the suspension system's current operating strategy. For instance, the system may be sustained in a vertical lock or unlocked mode of operation.

However, if it is determined that a transition into the vertical lock mode is wanted, the method proceeds to 408. At 408, the method includes transitioning the suspension system into a vertical lock mode. Transitioning the system into the vertical lock mode includes at 410, closing the 4/2 type electrically activated valve in the manifold via valve energization. In the closed position, the 4/2 valve a bridge connection permits fluid flow between the first piston chamber and the second piston chamber and restricts fluid flow to a first damping device and a second damping device from the first and second hydraulic cylinders. The bridge connection in the valve enables roll motion locking to be inhibited while vertical locking is activated. In this way, the vehicle may exhibit targeted handling characteristics. Although, the electrically activated valve in method 400 is described as a 4/2 style valve, other electrically activated valve configurations have been envisioned.

If it is determined that a transition into the vertical unlock mode is desired, the method proceeds to 412. At 412, the method includes transitioning into the vertical unlock mode. Transitioning into the vertical unlock mode includes at 414, opening the 4/2 electrically activated valve in the central manifold via de-energizing the valve. In the open position, fluid flow between the opposing piston chambers of the two hydraulic cylinders and associated accumulators is permitted while bridge-flow between the opposing piston chambers through the valve is inhibited. In this way, the system can exhibit vertical suspension movement. In the vertical unlock mode, suspension roll motion may be locked and unlocked based on vehicle operating conditions. For instance, roll motion may be unlocked during a leveling function. To elaborate, suspension roll motion may be unlocked responsive to locking vertical motion of the first and second hydraulic cylinders through the operation of valves coupled to the piloted check valves in the central manifold. For example, electrically activated valves coupled to the piloted check valves (e.g., the valves 236 and 238 shown in FIG. 2) may be jointly energized to pilot open the check valves and permit suspension roll motion. In one example, these electrically activated valves may be energized via a common command signal. In this way, the system's command logic may be simplified. Conversely, the electrically activated valves coupled to the piloted check valves may be de-energized to close the check valves and lock roll motion. In this way, suspension roll motion may be locked and unlocked at advantageous times that allow the vehicle to achieve desired handling characteristics and avoid handling characteristics that may diminish handling performance. The method may further include, in one example, opening the electrically activated valve (e.g., the valve 238 shown in FIG. 2) coupled to the LS line (e.g., the line 108 shown in FIG. 2) while closing the other valves in the system (e.g., valve 236, valve 126, and/or the valves in the leveling manifold) to discharge fluid from the accumulators. As previously discussed, when the valves are in this arrangement, accumulator discharge operation may unfold during a servicing procedure, for example. Thus, the LS line may serve as a drain passage during servicing. In this way, the system may be more efficiently serviced.

FIG. 6 depicts an exemplary chart 600 which correlates the roll and vertical motion operational variants in the hydraulic suspension system (e.g., hydraulic suspension system 102, shown in FIGS. 1-2) to one another in an operational mode matrix, in one embodiment. As described herein exemplary does not denote any sort of preference but rather indicates one of many possible facets of the systems and methods described herein. Row 602 indicates an operational configuration in the system where roll motion is permitted. When roll motion is permitted, the left and right hydraulic cylinders permit side-to-side angular movement of the suspension system (e.g., axle). Row 604 indicates an operational configuration in the system where roll motion is controlled. For instance, controlling roll motion may include substantially inhibiting roll motion or constraining roll motion with a desired range. Column 606 indicates an operational configuration of the system where vertical motion is locked and column 608 indicates an operational configuration of the system where the suspension is active (suspended vertical motion (e.g., sprung and/or dampened motion) is allowed to occur). As shown, when the system permits roll motion, vertical motion may be locked or vertical suspension movement may be permitted. However, when roll motion is controlled, the system hydro-mechanically permits (e.g., guarantees) that locking of the system's vertical motion is inhibited. Thus, when roll motion is controlled vertical suspension movement may be solely allowed. In this way, conditions which may degrade vehicle handling performance can be avoided.

The hydraulic suspension systems and methods described herein have the technical effect of reducing the likelihood (e.g., avoiding) of decreasing handling performance below a desired value via the avoidance of a condition where one or the two hydraulic cylinders is locked while the other cylinder is unlocked. Another technical effect of the systems and methods described herein is to enable suspension roll motion to be unlocked which allows fluid flow to both hydraulic cylinders when the system's leveling function is active. Flowing fluid to both cylinders allows for the stiffness and position of the cylinders to be more balanced, if so desired, thereby increasing vehicle handling performance.

FIGS. 1-3 and 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the term "substantially" is construed to mean plus or minus five percent of the range unless otherwise specified.

The invention will be further described in the following paragraphs. In one aspect, a hydraulic suspension system is provided that comprises: a first manifold including a piston-side interface and a rod-side interface fluidically coupled to a piston chamber and a rod chamber, respectively, for each of a first hydraulic cylinder and a second hydraulic cylinder; wherein the first manifold includes: a first electrically activated valve fluidically coupled to the piston-side interfaces, a first damping device, and a second damping device; wherein the first electrically activated valve is configured to lock and unlock vertical motion of the first and second hydraulic cylinders; and wherein while vertical motion of the first and second hydraulic cylinders is locked, the first electrically activated valve permits fluidic communication between the first and second hydraulic cylinders to permit free roll motion in the hydraulic suspension system.

In another aspect, a method for operation of a hydraulic suspension system is provided that comprises: locking vertical motion of a first hydraulic cylinder and a second hydraulic cylinder by closing a first electrically activated valve positioned in a first manifold and fluidically coupled to a first piston chamber of the first hydraulic cylinder and a second piston chamber of the second hydraulic cylinder; wherein in the closed position the first electrically activated valve permits fluid flow between the first piston chamber and the second piston chamber and restricts fluid flow to a first damping device and a second damping device from the first and second hydraulic cylinders, respectively. In one example, the method may further comprise unlocking the vertical motion of the first and second hydraulic cylinders by opening the first electrically activated valve. In another example, the method may further comprise unlocking suspension roll motion by closing of a second electrically activated valve coupled to a plurality of piloted check valves and a load sensing (LS) line. Further, in one example, the method may further comprise opening a second electrically activated valve coupled to a load sensing line in the first manifold while closing the first electrically activated valve to discharge fluid from one or more accumulators in the hydraulic suspension system.

In yet another aspect, a hydraulic suspension system is provided that comprises a manifold fluidically coupled to a piston chamber and a rod chamber of each of a first hydraulic cylinder and a second hydraulic cylinder; wherein the manifold includes: a first electrically activated valve fluidically coupled to the piston chambers of the first and second hydraulic cylinders and a first damping device and a second damping device; and a controller configured to: during a first operating condition, lock vertical motion of the first and second cylinders by closing the first electrically activated valve; wherein while vertical motion of the first and second hydraulic cylinders is locked, fluidic communication between the first and second hydraulic cylinders is permitted.

In any of the aspects or combinations of the aspects, the first electrically activated valve may be closed via energization of the first electrically activated valve.

In any of the aspects or combinations of the aspects, energizing the first electrically activated valve may close the first electrically activated valve to lock the vertical motion and de-energizing the first electrically activated valve may open the first electrically activated valve to unlock the vertical motion.

In any of the aspects or combinations of the aspects, closing the first electrically activated valve may activate a bridge connection and the bridge connection may fluidically couple the piston chambers of the first and second hydraulic cylinders and may restrict fluid flow to the first and second damping devices from the piston chambers.

In any of the aspects or combinations of the aspects, the bridge connection may be configured to: allow free roll movement in the suspension system independent of a plurality of check valves in the manifold; and stabilize pressure in the piston chambers of the first and second hydraulic cylinders after transients between the piston chambers of the first and second hydraulic cylinders and a plurality of accumulators fluidically coupled to the first and second damping devices.

In any of the aspects or combinations of the aspects, while the vertical motion in the first and second hydraulic cylinders is unlocked by the first electrically activated valve, the first damping device may be in fluidic communication with the first hydraulic cylinder and the second damping device may be in fluidic communication with the second hydraulic cylinder.

In any of the aspects or combinations of the aspects, the hydraulic suspension system may further comprise a plurality of piloted check valves fluidically coupled to the piston-side interfaces and the rod-side interfaces of the first manifold.

In any of the aspects or combinations of the aspects, the plurality of piloted check valves may be fluidically coupled to an LS component via a second electrically activated valve.

In any of the aspects or combinations of the aspects, the hydraulic suspension system may further comprise a leveling manifold fluidically coupled to the first manifold, wherein when leveling operation in the leveling manifold is active, the plurality of piloted check valves may unlock suspension roll motion to balance cylinder leveling independently of a status of at least one electrically activated piloting control valve in the first manifold.

In any of the aspects or combinations of the aspects, the first and second hydraulic cylinders may be fluidically coupled to an independent front suspension assembly.

In any of the aspects or combinations of the aspects, the first electrically activated valve may be closed via energization of the first electrically activated valve.

In any of the aspects or combinations of the aspects, the second electrically activated valve may be closed via energization.

In any of the aspects or combinations of the aspects, the second electrically activated valve may be closed via energization.

In any of the aspects or combinations of the aspects, the suspension roll motion may be unlocked responsive to locking the vertical motion of the first and second hydraulic cylinders.

In any of the aspects or combinations of the aspects, the suspension roll motion may be unlocked responsive to initiating leveling operation in a leveling manifold in fluidic communication with the first manifold.

In any of the aspects or combinations of the aspects, the controller may be configured to unlock the vertical motion of the first and second cylinders by opening the first electrically activated valve.

In any of the aspects or combinations of the aspects, the hydraulic suspension system may further comprise a plurality of piloted check valves coupled to the piston chambers of the first and second hydraulic cylinders and the rod chambers of the first and second hydraulic cylinders; wherein the plurality of piloted check valves may be coupled to a load sensing (LS) line via a second electrically activated valve; and wherein the controller may be configured to unlock suspension roll motion by closing the second electrically activated valve.

In any of the aspects or combinations of the aspects, the first electrically activated valve may connect the first damping device to the second damping device via a bridge connection when the first electrically activated valve is closed and locking the vertical motion of the first and second hydraulic cylinders; and the bridge connection may stabilize pressure in the piston chambers of the first and second hydraulic cylinders after transients between the piston chambers and a plurality of accumulators fluidically coupled to the first and second damping devices.

In any of the aspects or combinations of the aspects, the hydraulic suspension system may further comprise a leveling manifold coupled to the first manifold via a tank line and a pressure source line and wherein the leveling manifold may include a plurality of valves configured to independently adjust pressure in the first and second hydraulic cylinders independent from position adjustment of the first and second hydraulic cylinders.

In another representation, an independent suspension arrangement in a vehicle is provided that comprises a central manifold including a valve in selective fluidic communication with piston and rod sides of each cylinder in a pair of double acting hydraulic cylinders; wherein the valve operates in a locked state in which the valve routes fluid between the pair of double acting hydraulic cylinders; and wherein the valve operates in an unlocked state in which the valve routes fluid between the pair of double acting hydraulic cylinders and a pair of accumulators.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various suspension system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken to alter a state of a device. The specific routines described herein may represent one or more of any number of processing strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology may be applied to hydraulic suspension systems with different configurations and in a vehicle with a variety of propulsion sources such as motors, engines, combinations thereof, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydraulic suspension system, comprising:
 a first manifold including a piston-side interface and a rod-side interface fluidically coupled to a piston chamber and a rod chamber, respectively, for each of a first hydraulic cylinder and a second hydraulic cylinder;
 wherein the first manifold includes:
  a first electrically activated valve fluidically coupled to the piston-side interfaces, a first damping device, and a second damping device;
  wherein the first electrically activated valve is configured to lock and unlock vertical motion of the first and second hydraulic cylinders; and
 wherein while vertical motion of the first and second hydraulic cylinders is locked, the first electrically activated valve permits fluidic communication between the first and second hydraulic cylinders to permit free roll movement in the hydraulic suspension system independent of a plurality of check valves in the first manifold.

2. The hydraulic suspension system of claim 1, wherein energizing the first electrically activated valve closes the first electrically activated valve to lock the vertical motion and de-energizing the first electrically activated valve opens the first electrically activated valve to unlock the vertical motion.

3. The hydraulic suspension system of claim 2, wherein closing the first electrically activated valve activates a bridge connection and wherein the bridge connection fluidically couples the piston chambers of the first and second hydraulic cylinders and restricts fluid flow to the first and second damping devices from the piston chambers.

4. The hydraulic suspension system of claim 3, wherein the bridge connection is configured to:
 allow the free roll movement in the suspension system independent of the plurality of check valves in the first manifold; and
 stabilize pressure in the piston chambers of the first and second hydraulic cylinders after transients between the piston chambers of the first and second hydraulic cylinders and a plurality of accumulators fluidically coupled to the first and second damping devices.

5. The hydraulic suspension system of claim 1, wherein while the vertical motion in the first and second hydraulic cylinders is unlocked by the first electrically activated valve, the first damping device is in fluidic communication with the first hydraulic cylinder and the second damping device is in fluidic communication with the second hydraulic cylinder.

6. The hydraulic suspension system of claim 1, further comprising a plurality of piloted check valves fluidically coupled to the piston-side interfaces and the rod-side interfaces of the first manifold.

7. The hydraulic suspension system of claim 6, wherein the plurality of piloted check valves are fluidically coupled to a load sensing (LS) component via a second electrically activated valve.

8. The hydraulic suspension system of claim 6, further comprising a leveling manifold fluidically coupled to the first manifold, wherein when leveling operation in the leveling manifold is active, the plurality of piloted check valves unlock suspension roll motion to balance cylinder leveling independently of a status of at least one electrically activated piloting control valve in the first manifold.

9. The hydraulic suspension system of claim 1, wherein the first and second hydraulic cylinders are fluidically coupled to an independent front suspension assembly.

* * * * *